(12) United States Patent
Takai

(10) Patent No.: US 8,303,423 B2
(45) Date of Patent: Nov. 6, 2012

(54) POWER TRANSMISSION

(75) Inventor: Kazuhiko Takai, Isesaki (JP)

(73) Assignee: Sanden Corporation, Isesaki-shi, Gunma (JP)

( * ) Notice: Subject to any disclaimer, the term of this patent is extended or adjusted under 35 U.S.C. 154(b) by 268 days.

(21) Appl. No.: 12/668,820

(22) PCT Filed: Jul. 10, 2008

(86) PCT No.: PCT/JP2008/062458
§ 371 (c)(1),
(2), (4) Date: Jan. 12, 2010

(87) PCT Pub. No.: WO2009/008469
PCT Pub. Date: Jan. 15, 2009

(65) Prior Publication Data
US 2010/0183359 A1    Jul. 22, 2010

(30) Foreign Application Priority Data

Jul. 12, 2007 (JP) ................ 2007-183111

(51) Int. Cl.
*F16D 9/04* (2006.01)
(52) U.S. Cl. .................. 464/32; 474/902
(58) Field of Classification Search ............ 464/32, 464/33; 474/70, 902; 403/2; 192/56.5
See application file for complete search history.

(56) References Cited

U.S. PATENT DOCUMENTS

| | | | |
|---|---|---|---|
| 1,498,281 A * | 6/1924 | Jones ............... | 464/33 |
| 1,672,582 A * | 6/1928 | Tenney ............. | 464/33 X |
| 7,223,176 B2 * | 5/2007 | Nosaka et al. | |
| 2010/0144450 A1* | 6/2010 | Takai et al. ....... | 464/32 |

FOREIGN PATENT DOCUMENTS

| | | |
|---|---|---|
| JP | H08-232838 A | 9/1996 |
| JP | H08-284824 A | 10/1996 |
| JP | 2003-049865 A | 2/2003 |
| JP | 2003-254402 A | 9/2003 |
| JP | 2008-064173 A | 3/2008 |

OTHER PUBLICATIONS

Japan Patent Office, International Search Report for International Patent Application No. PCT/JP2008/062458 (counterpart to above-captioned patent application), mailed Sep. 16, 2008.

* cited by examiner

*Primary Examiner* — Gregory Binda
(74) *Attorney, Agent, or Firm* — Baker Botts L.L.P.

(57) ABSTRACT

A power transmission interconnects a drive body and a driven body by a coupling member, transmits torque of the drive body to the driven body, and interrupts the torque when a drive load of the driven body exceeds a predetermined value. The coupling member has, as separate sections in the coupling member, both of a positive torque transmission section and a negative torque transmission section. The positive torque transmission section holds torque in the forward rotational direction and, when a drive load of the driven body exceeds the predetermined value, interrupts transmission of torque from the drive body by its own fracture. The negative torque transmission section holds torque in the reverse rotational direction. Even if there is a torque fluctuation on the drive body, its influence can be suppressed as little as possible, and interruption of torque can be performed properly at a target interruption torque value. The power transmission can be provided with a simple structure and an excellent assemblability.

9 Claims, 6 Drawing Sheets

(A)

(B)

(A)

(B)

(C)

(A)

(B)

(C)

POWER TRANSMISSION

CROSS-REFERENCE TO RELATED APPLICATIONS

This application is the National Stage of International Patent Application No. PCT/JP2008/062458, filed Jul. 10, 2008, which claims the benefit of Japanese Patent Application No. 2007-183111, filed Jul. 12, 2007, the disclosures of which are incorporated herein by reference in their entirety.

TECHNICAL FIELD OF THE INVENTION

The present invention relates to a power transmission, for example, to a power transmission suitable to transmit driving force from a vehicle engine to a device mounted in the vehicle (e.g. a compressor used in an air conditioning system for the vehicle).

BACKGROUND ART OF THE INVENTION

A function of a torque limiter for interrupting transmission of an excessive driving force is frequently required for a power transmission. For example, when a driving force from a vehicle engine is transmitted to a compressor used in an air conditioning system for a vehicle to drive the compressor, in case where the drive load of the compressor side as a driven body becomes excessive from some reason, it is required to interrupt transmission of the driving force (transmission of torque) in order to protect the vehicle engine or a belt.

Various mechanisms are known as such a mechanism for interrupting transmission of torque, and for example, known is a fracture-type torque limiter which is provided with a member or a section to be fractured when a transmission load over a predetermined value is applied between a member at the driving side and a member at the driven side. For example, in a power transmission disclosed in Patent document 1, a fracture-type torque limiter is provided wherein, when a compressor is abnormally stopped by a failure, etc., a coupling member which is provided between a pulley at the drive source side and a rotation transmission plate attached to a shaft of the compressor at the driven side is fractured.
Patent document 1: Japanese Utility Model 6-39105

DISCLOSURE OF THE INVENTION

Problems To Be Solved By the Invention

In the above-described conventional fracture-type torque limiter, however, particularly in case where the drive source is one such as an engine accompanying with output fluctuation, generally the following problems are involved. As explained with the structure described in the above-described Patent document 1 as an example, in the structure described in Patent document 1, as shown in FIG. 7, rotation transmission plate 103 is attached to the end portion of main shaft 102 of compressor 101, the driving force from an engine (not shown) is transmitted from pulley 104 to rotation transmission plate 103 through coupling member 105 provided so as to connect between the pulley 104 and rotation transmission plate 103, thereby rotating the main shaft 102. In the power transmission for compressor thus constructed, to coupling member 105 as a shear load-holding type torque interruption body (or torque transmission body), a load accompanied with an engine torque fluctuation is applied, and the shear stress is alternately loaded to the coupling member 105 in the forward/reverse directions with respect to the rotational direction. In application of such an alternate load, a fatigue may be generated in coupling member 105, the coupling member 105 may be fractured at a torque lower than a target interruption torque value, and there is a fear that the torque interruption is not carried out at a predetermined value. Further, although, except the formation of the above-described coupling member 105 applied with the shear load, a system may be considered wherein a plate-like member merely extending along the rotational direction connects between a pulley and a hub of the main shaft side of the compressor, in such a case, a tensile load and a compressive load are applied to the plate-like member as alternate load, a metal fatigue may be generated also in the plate-like member, and interruption torque cannot be set precisely.

Such a problem in the conventional device may be expressed diagramatically as follows. Namely, although fluctuation of output of an engine is generated by a rotational fluctuation accompanying with stroke change of explosion/compression of the engine, when a maximum torque value of positive torque side including torque fluctuation in the above-described power transmission is referred to as Wp and a maximum torque value of negative torque side is referred to as Wn, as shown in FIG. 8, the total amplitude becomes (Wp+Wn). In the shear load holding type torque interruption body shown in FIG. 7, because the shear stress is applied alternately in both directions of the forward direction (normal direction) and reverse direction, a similar explanation can be employed. Thus, in the conventional fracture-type torque transmission device, because the above-described fluctuation load due to torque amplitude is operated as a whole, the torque transmission member to be functioned as a torque interruption body causes a fatigue phenomenon, and therefore, torque is interrupted at a torque value lower than a target interruption torque value. If the fracture-type torque limiter is designed in consideration of this fatigue of material, the momentary interruption torque may become excessive, and it is not suitable for protection of a belt or an engine.

With such problems in the conventional device, a previously-proposed, power transmission, in which a drive body and a driven body are coupled through a coupling portion, is formed by members different from each other, e.g., by a positive torque transmission member and a negative torque transmission member; and an excessive transmitted torque is interrupted by fracture of the positive torque transmission member (Japanese Patent Application No. 2006-241277). The Japanese patent application was unpublished as of Jul. 12, 2007. Although most of the above-described problems in the conventional device can be solved by this proposed structure, in this proposed structure, because the positive torque transmission member and the negative torque transmission member are constituted as members different from each other, left are such problems as that assemblability is not good, that application of preload becomes complicated and that a plurality of parts with a high accuracy become necessary.

Accordingly, first, in order to solve the above-described problems in the conventional device, an object of the present invention is to provide a power transmission which, even if there is a torque fluctuation in a drive body side (for example, even if there is an output torque fluctuation of an engine), can suppress its influence as little as possible, and can perform torque interruption properly at a target interruption torque value.

Another object of the present invention is to simplify the structure of a coupling member between a drive body and a driven body as compared with the structure previously proposed by the applicant of the present invention (the structure described in Japanese Patent Application No. 2006-241277), thereby achieving cost down and improving assemblability.

Means For Solving the Problems

To achieve the above-described objects, a power transmission according to the present invention in which a driven body and a drive body for driving the driven body are rotated in the same direction and are coupled through a coupling member, torque of the drive body is transmitted to the driven body, and transmission of torque from the drive body is interrupted when a drive load of the driven body exceeds a predetermined value, is characterized in that the coupling member has, as separate sections in the coupling member, both of a positive torque transmission section for holding torque in a forward rotational direction and interrupting transmission of torque from the drive body by its own fracture when a drive load of the driven body exceeds the predetermined value, and a negative torque transmission section for holding torque in a reverse rotational direction. Namely, the coupling portion is not formed by combination of a positive torque transmission member and a negative torque transmission member provided as members different from each other as in the structure previously proposed by the applicant of the present invention (the structure described in Japanese Patent Application No. 2006-241277), but the structure is formed so as to have both of the positive torque transmission section and the negative torque transmission section as sections different from each other in the coupling member, and in the structure, the respective torque transmission sections receive a positive torque and a negative torque. By this structure, while it is suppressed that a fatigue phenomenon occurs by an alternate load only in a common part, a function for interruption precisely at a target interruption torque value can be given to the positive torque transmission section, and it can be avoided that a torque transmission member is fractured at a torque much smaller than the target interruption torque value. Further, since the positive torque transmission section and the negative torque transmission section are both formed in the coupling member, the structure is simplified, the cost thereof can be reduced and the assemblability of the coupling member itself and the assemblability of the coupling member into a predetermined place can be improved.

In this power transmission according to the present invention, it is preferred that preloads in directions opposite to each other are applied to the positive torque transmission section and the negative torque transmission section, and both preloads are in a condition approximately balanced with each other from a relationship of action/reaction. By applying such preloads, as described later, it becomes possible to greatly decrease the amplitude of fluctuation of torque being transmitted, thereby suppressing the influence due to fatigue of material as little as possible.

As the formation of the above-described preloads, a formation may be employed wherein a tensile preload is applied to the positive torque transmission section and a compressive preload is applied to the negative torque transmission section. By thus applying both of the tensile preload and the compressive preload with respect to the device rotational direction, when the amplitude of fluctuation of torque is decreased, the tensile preload and the compressive preload can operate in approximately just opposite directions, and therefore, it becomes possible to greatly decrease the amplitude of fluctuation of torque efficiently and extremely effectively.

Further, it is preferred that a rigidity of the above-described positive torque transmission section is set lower than a rigidity of the above-described negative torque transmission section. When torque interruption is carried out at a target interruption torque value, because it is desirable that the torque interruption is carried out relative to an excessive torque of positive torque side from the viewpoint of protection of the device, it is preferred to fracture the positive torque transmission section when an excessive torque is generated, and the above-described structure is a structure for realizing this securely.

Further, in the power transmission according to the present invention, also as shown in the embodiment described later, it is particularly preferred that the negative torque transmission section is disposed on each side of the positive torque transmission section. By employing such a structure of disposition, in the coupling member having both of the positive torque transmission section and the negative torque transmission section, preloads in directions opposite to each other can be given to the positive torque transmission section and the negative torque transmission section more easily at a good balance.

Further, it is preferred that the positive torque transmission section is formed as a continuous structure (continuously extending structure), and the negative torque transmission section is formed as a divided structure (a structure having a division portion on the way in the extending direction). By forming the positive torque transmission section as a continuous structure, its own fracture relative to an excessive torque can be facilitated and interruption of torque transmission can be performed securely at a target torque value, and by forming the negative torque transmission section as a divided structure, it becomes possible to easily apply the compressive preload to the negative torque transmission section, and ultimately, a tensile preload can also be easily applied to the positive torque transmission section as a reaction of the compressive preload.

Such a structure may be formed, for example, as a structure wherein contact portions are provided between both divided parts in the negative torque transmission section formed as a divided structure, and a compressive preload is applied via the contact portions.

More concretely, for example, a structure can be employed wherein an approximate hole shape portion is formed between the contact portions of both divided parts, a compressive preload is applied to the negative torque transmission section by inserting a hole enlarging member into the approximate hole shape portion and enlarging a distance between the contact portions, and a tensile preload is applied to the positive torque transmission section by elongating the positive torque transmission section by the compressive preload. In such a structure, easily desirable compressive preload and tensile preload are both applied.

In such a structure, because it is considered that the above-described hole enlarging member may fall off when the positive torque transmission section is fractured for torque interruption, it is preferred that a falling-off preventing member is provided for preventing falling-off of the hole enlarging member after torque interruption.

Further, as another embodiment, a structure may be employed wherein a folded portion is formed on one of both divided parts in the negative torque transmission section formed as a divided structure, so as to be folded toward the other divided part, the folded portion is formed so that an interference is generated between an end part of the folded portion and an end part of the other divided part when folded, a compressive preload is applied to the negative torque transmission section by making the interference vanish by folding of the folded portion and by bringing an end surface of the end part of the folded portion into surface contact with an end surface of the end part of the other divided part, and a tensile preload is applied to the positive torque transmission section by elongating the positive torque transmission section by the compressive preload. Also in such a structure, easily desirable compressive preload and tensile preload are both applied.

Furthermore, in the power transmission according to the present invention, it is preferred that the negative torque transmission section is disposed on each side of the positive torque transmission section, the positive torque transmission section is formed as a continuous structure, the negative torque transmission section is formed as a divided structure, and in such a structure, the division portions of both negative torque transmission sections are disposed at positions shifted from each other in an extending direction of the positive torque transmission section (shifted in the left/right direction). By this, it becomes possible to suppress unnecessary interference between the respective torque transmission sections after torque interruption.

Effect According to the Invention

Thus, in the power transmission according to the present invention, even in case where there is a torque fluctuation in the side of a drive source or the drive body, for example, even in case, where there is an engine torque fluctuation, it becomes possible to suppress its influence as little as possible, and occurrence of fatigue of the material in the coupling member can be suppressed and the interruption of torque can be performed properly at a target interruption torque value.

Further, in the power transmission according to the present invention, since the structure is employed wherein the coupling member has both of the positive torque transmission section and the negative torque transmission section, the structure of the coupling member is very simple, the number of parts thereof is few, and it can be carried out at a low cost.

EXPLANATION OF SYMBOLS

Figure 1:
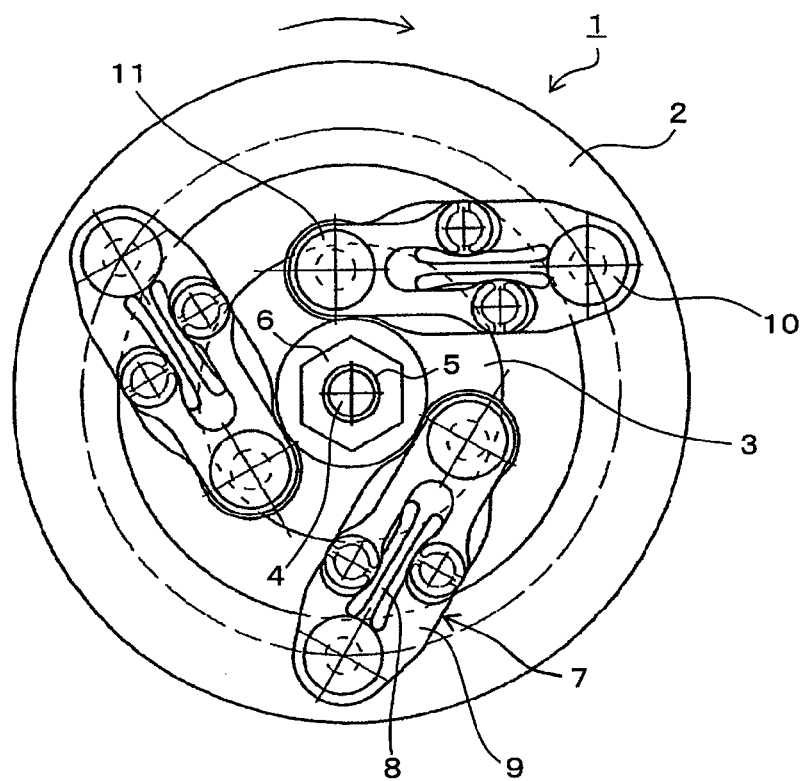
FIG. 1 is an elevational view of a power transmission according to Example 1 of the present invention.

1: power transmission
2: pulley as drive body
3: hub as driven body
4: main shaft of compressor
5: screw portion of main shaft
6: nut
7, 21: coupling member
8, 22: positive torque transmission section
9, 23: negative torque transmission section
10, 11: pin or rivet
12: division portion
13: contact portion
14: approximate hole shape portion
15: hole enlarging member
16: falling-off preventing member
17: hole
18, 25: hole for coupling
24: folded portion

THE BEST MODE FOR CARRYING OUT THE INVENTION

Hereinafter, desirable embodiments of the present invention will be explained referring to figures.

FIGS. 1-4 show a power transmission according to Example 1 of the present invention. In FIG. 1 (at the time of torque transmission) and FIG. 2 (at the time of torque interruption), numeral 1 indicates the entire power transmission, and power transmission 1 has pulley 2 as a drive body, for example, transmitted with a driving force from an engine, and hub 3 as a driven body, for example, connected and fixed to the end portion of main shaft 4 of a compressor via screw portion 5 of main shaft 4 and nut 6, which are rotated in the direction shown by the arrow in FIG. 1. These pulley 2 and hub 3 are coupled through coupling member 7, the torque of pulley 2 provided as a drive body is transmitted to hub 3 provided as a driven body, and when the drive load of the driven body exceeds a predetermined value, the torque transmission is interrupted by fracture of a positive torque transmission section of coupling member 7, as described later. In this Example, a plurality of coupling members 7, in particular, three coupling members 7 (three sets), are disposed at an equal interval in the circumferential direction.

Each coupling member 7 itself has both of a positive torque transmission section 8 for transmitting a torque in a direction of forward rotation (arrow direction in FIG. 1) and for interrupting the torque transmission from the drive body by its own fracture when the drive load of the driven body exceeds the predetermined value, and a negative torque transmission section 9 capable of transmitting torque in the reverse rotational direction, which are provided as sections separate from each other in the coupling member 7. The rigidity of positive torque transmission section 8 is set lower than the rigidity of negative torque transmission section 9, and when an excessive torque is generated, the side of positive torque transmission section 8 is securely fractured. In this Example, each coupling member 7 is disposed between pulley 2 provided as the drive body and hub 3 provided as the driven body, and the respective end portions thereof are coupled to pulley 2 side and hub 3 side via pin or rivet 10, 11.

As depicted in FIG. 3(A), each coupling member 7 has both of positive torque transmission section 8 which comprises a thin sectional portion given with a tensile preload in the positive torque direction and negative torque transmission sections 9 disposed on both sides of positive torque transmission section 8, and the tensile preload is applied to positive torque transmission section 8 as reaction of the compressive preload applied to negative torque transmission sections 9. More concretely, positive torque transmission section 8 extends as a thin sectional portion at a form of a continuous structure in the central portion of coupling member 7, and each negative torque transmission section 9 is formed as a divided structure having a division portion 12 on the way in the extending direction of positive torque transmission section 8. In division portion 12 of each negative torque transmission section 9 formed as a divided structure, namely, at a position between both divided parts, a contact portion 13 is formed, and the structure is formed wherein a compressive preload is applied via the contact portion 13.

In this Example, an approximate hole shape portion 14 is formed between contact portions 13 of both divided parts, a compressive preload is applied to each negative torque transmission section 9 by inserting a hole enlarging member 15 (for example, comprising a rivet and being caulked after being attached) into the approximate hole shape portion 14 and enlarging the distance between contact portions 13. In other words, by a condition where hole enlarging member 15 is inserted into approximate hole shape portion 14 and the hole enlarging member 15 is broken in its axial direction and is enlarged in its radial direction, the width of approximate hole shape portion 14 is appropriately enlarged, a compressive load is applied to each of contact portions 13 at both sides which form the approximate hole shape portion 14, thereby applying a compressive preload to each negative torque transmission section 9. By reaction of this compressive preload, positive torque transmission section 8 positioned between both negative torque transmission sections 9 is elongated, and a tensile preload is applied to the positive torque transmission section 8. In order to prevent excessive enlargement of the distance between contact portions 13 (excessive enlargement of the width of approximate hole shape portion 14) due to insertion and caulking of hole enlarging member 15 and in order to prevent excessive provision of tensile preload to positive torque transmission section 8, the initial distance between contact portions 13 (initial width of approximate hole shape portion 14) is optimized. By this structure, easily desirable compressive preload and tensile preload are both given. Where, in this Example, a falling-off preventing member 16 is provided for preventing falling-off of hole enlarging member 15 after torque interruption, and the hole enlarging member 15 is held in a hole 17 formed in the falling-off preventing member 16.

The assembly condition of the respective members shown in FIG. 3(A) including each coupling member 7 becomes the condition shown in FIGS. 4(A) and (B). When the respective dimensions of coupling member 7 before assembly are referred to as, as shown in FIG. 3(B), distance between holes for coupling 18: L, distance between one hole for coupling 18 and each division portion 12: $a_1$, $a_2$, and distance between contact portions 13 in each division portion 12 (initial width of approximate hole shape portion 14): b, after assembly, as shown in FIG. 4(C), by insertion and caulking of hole enlarging member 15, the distance between contact portions 13 in each division portion 12 (initial width of approximate hole shape portion 14) is enlarged by dL, the condition becomes as distance between holes for coupling 18: L+dL, distance between one hole for coupling 18 and each division portion 12: $a_1$+dL/2, $a_2$+dL/2, and distance between contact portions 13 in each division portion 12: b+dL. Therefore, by the amount of this enlargement, a compressive preload is applied to each negative torque transmission section 9, and as reaction thereof, a tensile preload is applied to positive torque transmission section 8, and by setting this amount of enlargement properly, respective desirable preloads are given easily. Where, the hole diameter of hole 17 formed in falling-off preventing member 16 is preferably set to be b+dL.

In power transmission 1 thus constructed, torque transmission is carried out as follows. At the time of usual torque transmission, the device is in the condition shown in FIG. 1. As explained using FIG. 6, if amplitude of torque fluctuation added to positive torque transmission section 8, for example, originating from engine torque fluctuation, is calculated, because a tensile preload greater than a torque value corresponding to, for example, the engine torque fluctuation, is applied to positive torque transmission section 8, a compressive stress is not generated at the usual transmission condition, and the fluctuation of load becomes φ times (φ<<1) of amplitude of torque fluctuation (Wp+Wn), the fluctuation of load becomes very small (namely, it becomes small by φ times as compared with the aforementioned conventional amplitude of torque fluctuation (Wp+Wn)). This is because spring constant Kb of positive torque transmission section 8 is set sufficiently small as compared with spring constant Kc of negative torque transmission section 9. Here, Wp indicates a maximum value of positive torque side among the engine torque fluctuation, and Wn indicates a maximum value of negative torque side among the engine torque fluctuation. Further, φ is calculated as φ=Kb/(Kb+Kc).

Thus, even if there is an engine torque fluctuation, its influence can be suppressed as little as possible. More concretely, the amplitude of fluctuation of the transmitted torque can be greatly decreased, fatigue of metal, particularly, fatigue of positive torque transmission section 8, is minimized, and it can operate properly at a target interruption torque when an excessive torque is generated.

Figure 2:
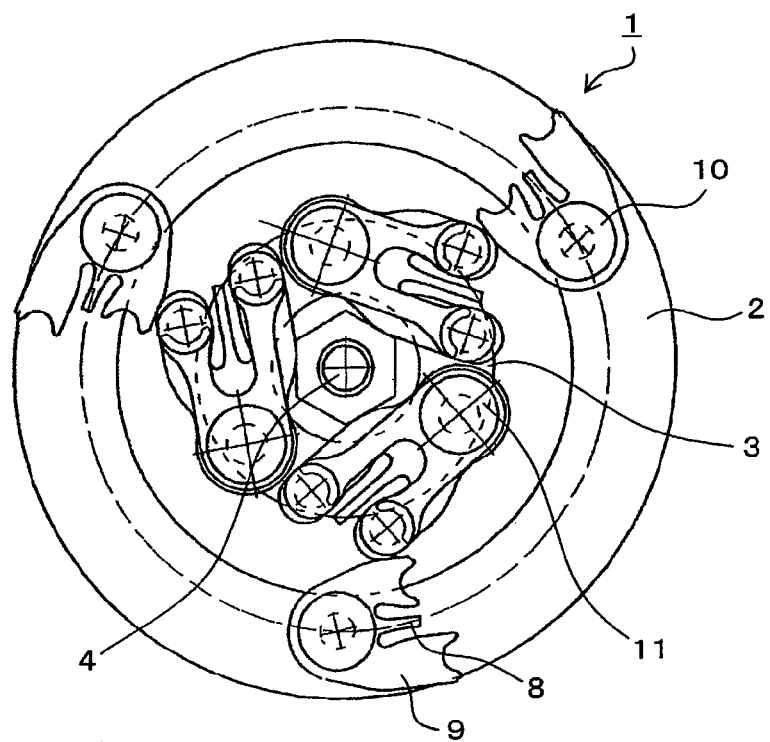
FIG. 2 is an elevational view of the device depicted in FIG. 1, showing a condition at the time of torque interruption.
Figure 3:
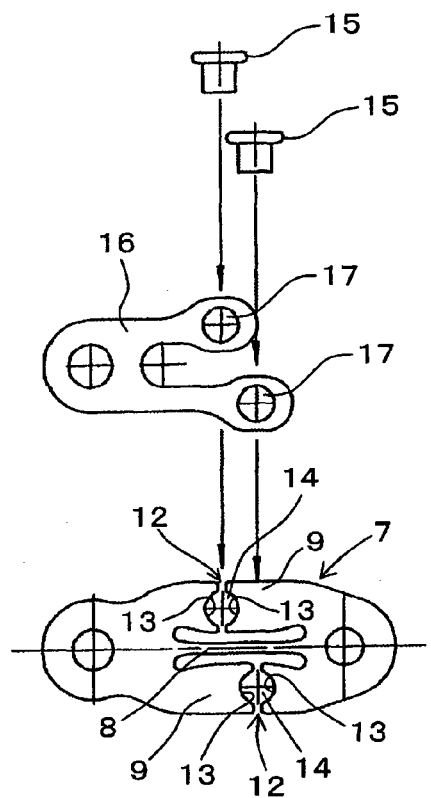
FIG. 3 shows plan views of a coupling member of the device depicted in FIG. 1.
Figure 3:
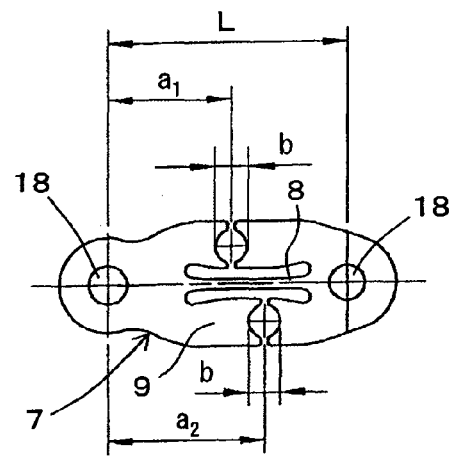
Figure 4:
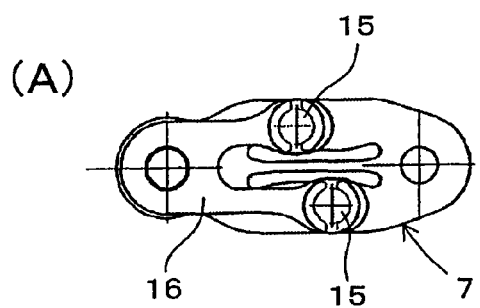
FIG. 4 shows plan views of the coupling member depicted in FIG. 3, showing its assembled condition.
Figure 4:
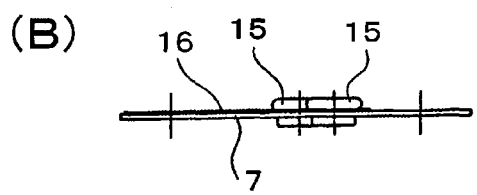
Figure 4:
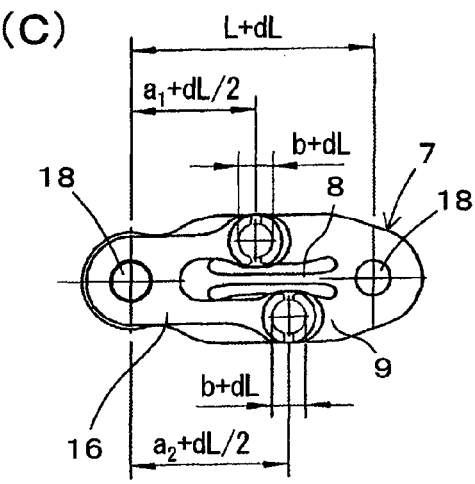

On the other hand, when an excessive torque is generated, as shown in FIG. 2, positive torque transmission section 8 whose rigidity is lowered than that of negative torque transmission section 9 is fractured, and the torque transmission is stopped. As a result, the rotation of hub 3 is stopped, the rotation of main shaft 4 is stopped, and the drive source side, that is, pulley 2 or a belt, etc. for transmitting a driving force to pulley 2 may be properly protected. Then, when positive torque transmission section 8 is fractured, negative torque transmission section 9 is quickly separated at division portion 12 to left/right sides, and it becomes a condition where only pulley 2 side runs idle. At that time, falling-off of hole enlarging member 15 is prevented by falling-off preventing member 16. Therefore, a desirable torque interruption is carried out smoothly and securely.

Since such operation and advantage can be achieved by the structure wherein positive torque transmission section 8 and negative torque transmission section 9 are both provided in coupling member 7 and positive torque and negative torque are received by the respective torque transmission sections 8, 9, it becomes possible to give desirable substantially independent functions to positive torque transmission section 8 and negative torque transmission section 9, respectively, as compared with the conventional structure where an alternate load of tensile and compressive loads is applied only to one common part to cause a fatigue phenomenon, and in particular, it becomes possible to fracture positive torque transmission section 8 precisely at a target interruption torque value. Therefore, while a desirable torque interruption with a high accuracy can be achieved, by the structure of coupling member 7 having both of positive torque transmission section 8 and negative torque transmission section 9, simplification of the structure and reduction of the cost can be achieved, and further, the assemblability of the coupling member itself and the assemblability of the coupling member into a predetermined place can be improved.

Figure 5:
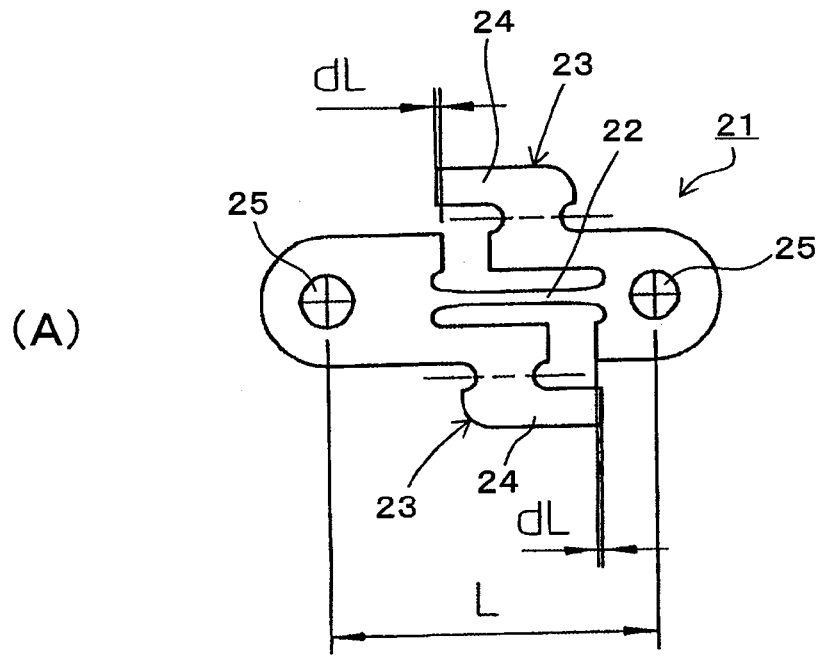
FIG. 5 shows plan views of a coupling member of a power transmission according to Example 2 of the present invention.
Figure 5:
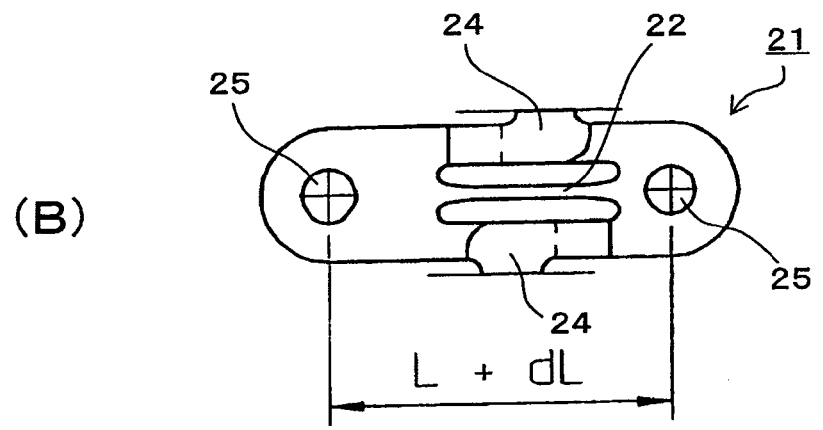
Figure 5:
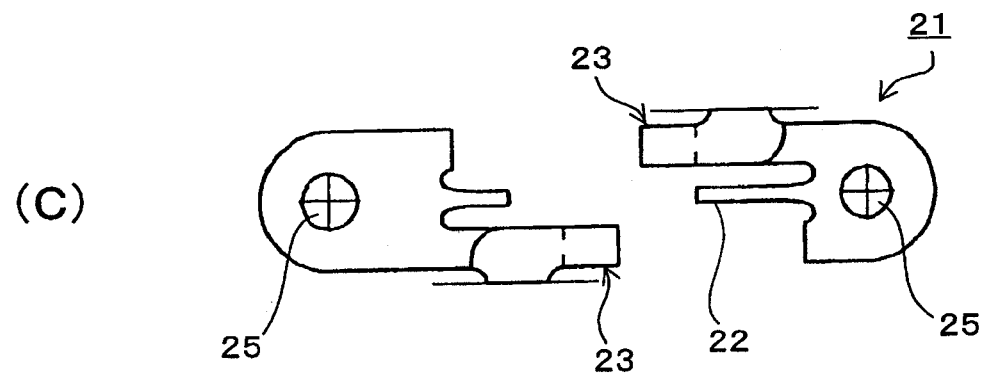

FIG. 5 shows a coupling member 21 of a power transmission according to Example 2 of the present invention, (A) depicts an initial part form of coupling member 21, (B) depicts a form where parts of coupling member 21 are folded to apply a predetermined preload to the coupling member 21, and (C) depicts a form at the time of torque interruption, respectively. In the initial part form of coupling member 21, as shown in FIG. 5(A), it comprises a plate-like member molded out by a press, etc., it has positive torque transmission section 22, formed as a thin sectional portion, in its central portion, on both sides thereof negative torque transmission sections 23 are formed, each negative torque transmission section 23 is formed as a divided structure, and one side of each part divided folded portion 24 to be folded toward the other part is provided. This folded portion 24 is set so that, when folded, an interference of dL is generated. When folded portion 24 is folded, the end surface of the end part of folded portion 24 is brought into surface contact with the end surface of the end part of the other divided part so as to make the interference dL vanish, and by that, each negative torque transmission section 23 is enlarged by the amount of dL (in FIG. 5(B), a condition is shown where the distance between holes for coupling 25 is enlarged from L to L+dL), and a compressive preload is applied to negative torque transmission section 23. By this compressive preload, positive torque transmission section 22 is elongated, and a tensile preload is applied to positive torque transmission section 22. By properly setting the above-described amount of interference dL, desirable preloads are given as both of compressive preload and tensile preload. When an excessive torque operates, as shown in FIG. 5(C), positive torque transmission section 22 is fractured, each negative torque transmission section 23 is divided at the division portion on the way, and torque interruption is carried out properly.

Figure 6:
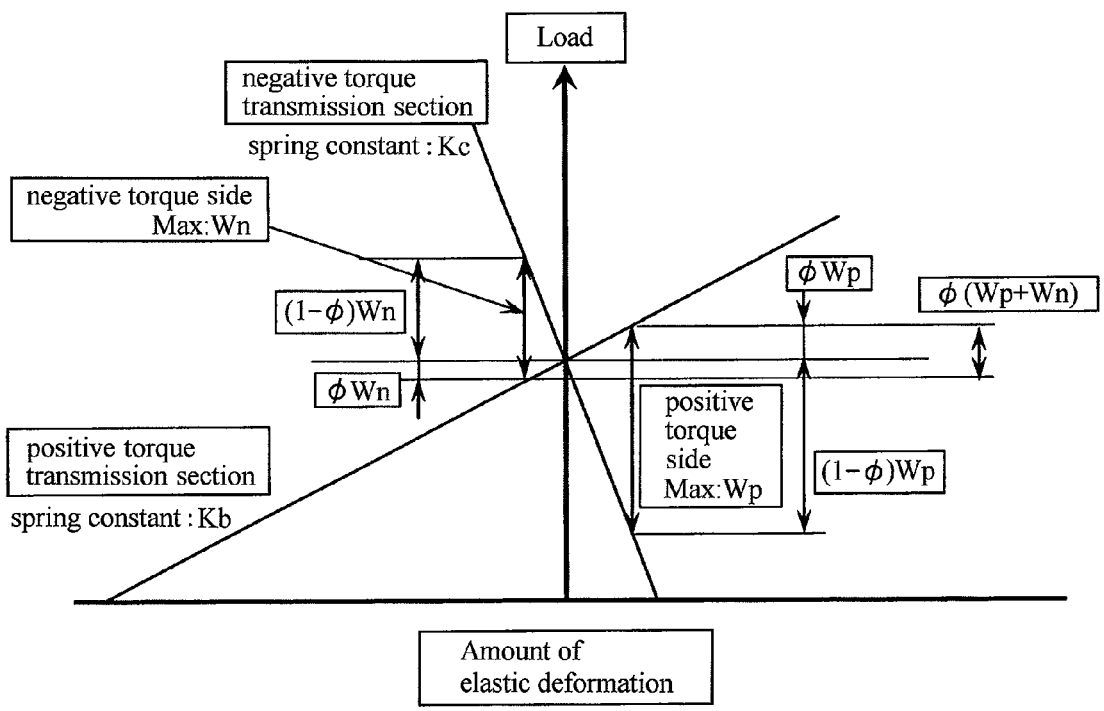
FIG. 6 is a diagram representing a relationship between amount of elastic deformation and load, showing a concept of a torque transmission condition in case where there is a torque fluctuation in the present invention.
Figure 7:
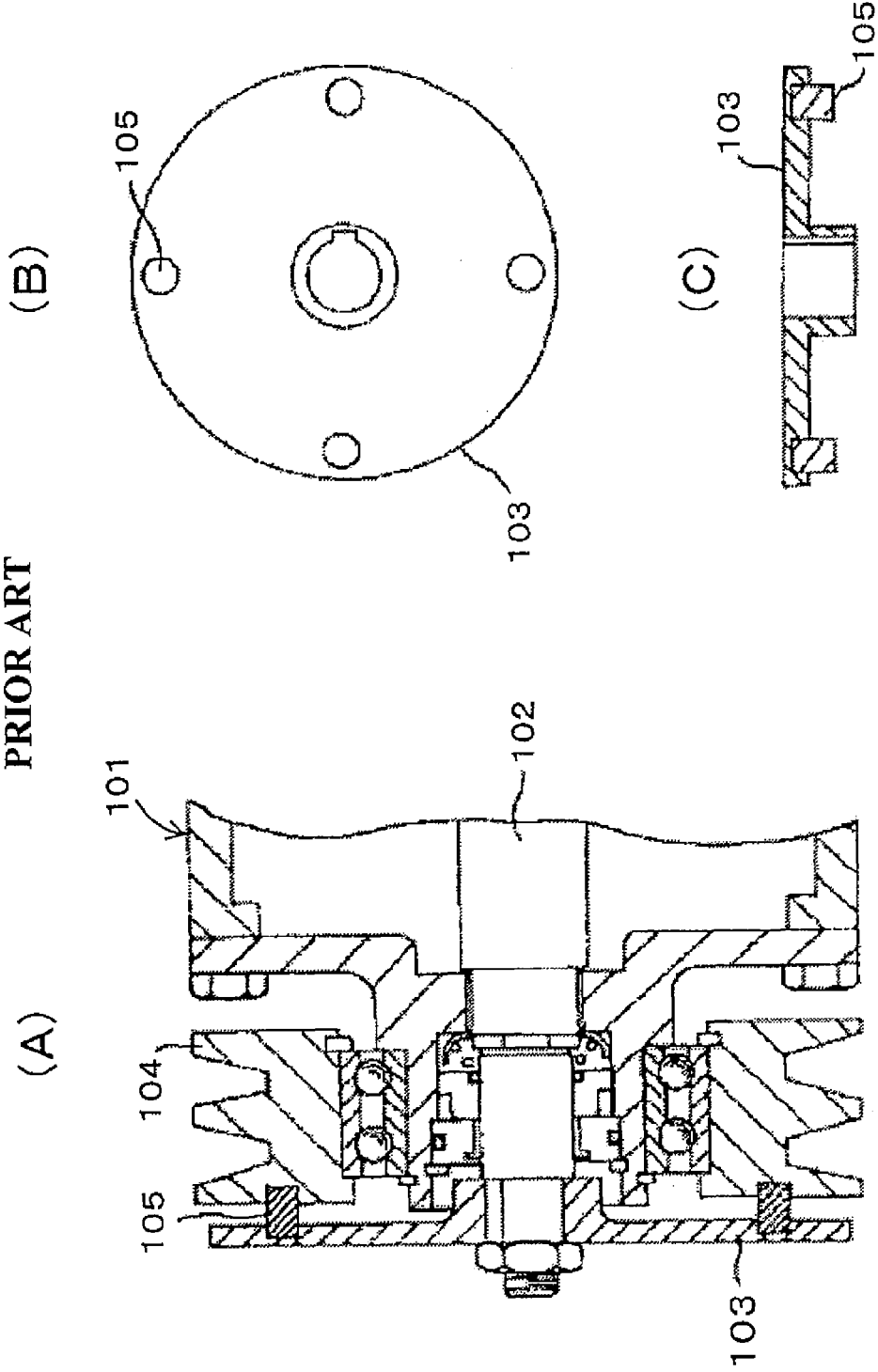
FIG. 7 shows a conventional power transmission, a vertical sectional view thereof (A), a partial elevational view thereof (B), and a partial sectional view thereof (C).
Figure 8:
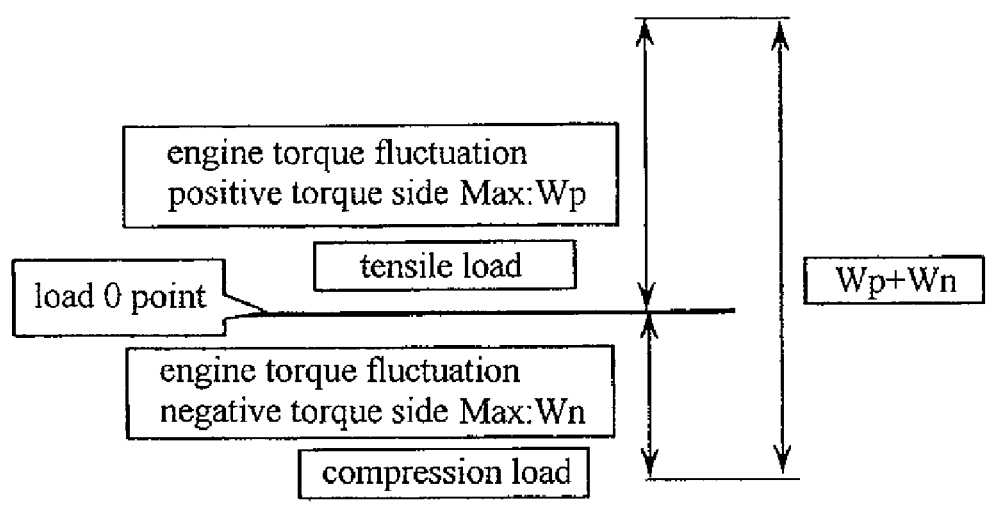
FIG. 8 is an explanation diagram showing a concept of transmitted torque amplitude in case where there is a torque fluctuation in the conventional power transmission.

Also in this Example 2, similarly to in Example 1, the operation and advantage explained using FIG. 6 can be obtained. Namely, if amplitude of torque fluctuation added to positive torque transmission section 22, originating from engine torque fluctuation, is calculated, because a tensile preload greater than a torque value corresponding to the engine torque fluctuation is applied to positive torque transmission section 22, a compressive stress is not generated at the usual transmission condition, and the fluctuation of load becomes $\phi$ times ($\phi \ll 1$) of amplitude of torque fluctuation (Wp+Wn), the fluctuation of load becomes very small (namely, it becomes small by $\phi$ times as compared with the aforementioned conventional amplitude of torque fluctuation (Wp+Wn)). Similarly to in Example 1, this is due to the condition where spring constant Kb of positive torque transmission section 22 is set sufficiently small as compared with spring constant Kc of negative torque transmission section 23.

Where, in both of Examples 1 and 2, although division portions of the negative torque transmission sections are provided so as to be shifted in the left/right directions, this is for the purpose for decreasing the amount of interference between respective parts in the coupling member after interruption.

INDUSTRIAL APPLICATIONS OF THE INVENTION

The structure of the power transmission according to the present invention can be applied to any power transmission in which torque interruption is performed by fracture of a coupling member between a rotational drive body and a driven body, in particular, it is suitable to a case where an vehicle engine is employed as a drive source, for example, a case of transmitting a power to a compressor used in an air conditioning system for vehicles.

The invention claimed is:
1. A power transmission in which a driven body and a drive body for driving said driven body are rotated in the same direction and are coupled through a coupling member,
torque of said drive body is transmitted to said driven body, and
transmission of torque from said drive body is interrupted when a drive load of said driven body exceeds a predetermined value,
characterized in that said coupling member has, as separate sections in said coupling member, both of
a positive torque transmission section for holding torque in a forward rotational direction and interrupting transmission of torque from said drive body by its own fracture when a drive load of said driven body exceeds said predetermined value, and
a negative torque transmission section for holding torque in a reverse rotational direction,
wherein
preloads in directions opposite to each other are applied to said positive torque transmission section and said negative torque transmission section,
both preloads are in a condition approximately balanced with each other from a relationship of action/reaction, and
said negative torque transmission section is disposed on each side of said positive torque transmission section.
2. The power transmission according to claim 1, wherein a tensile preload is applied to said positive torque transmission section and
a compressive preload is applied to said negative torque transmission section.
3. The power transmission according to claim 1, wherein a rigidity of said positive torque transmission section is set lower than a rigidity of said negative torque transmission section.
4. A power transmission in which a driven body and a drive body for driving said driven body are rotated in the same direction and are coupled through a coupling member,
torque of said drive body is transmitted to said driven body, and
transmission of torque from said drive body is interrupted when a drive load of said driven body exceeds a predetermined value,
characterized in that said coupling member has, as separate sections in said coupling member, both of
a positive torque transmission section for holding torque in a forward rotational direction and interrupting transmission of torque from said drive body by its own fracture when a drive load of said driven body exceeds said predetermined value, and
a negative torque transmission section for holding torque in a reverse rotational direction, wherein
said positive torque transmission section is formed as a continuous structure, and
said negative torque transmission section is formed as a divided structure.
5. The power transmission according to claim 4, wherein contact portions are provided between both divided parts in said negative torque transmission section formed as a divided structure, and
a compressive preload is applied via said contact portions.
6. The power transmission according to claim 5, wherein an approximate hole shape portion is formed between said contact portions of both divided parts,
a compressive preload is applied to said negative torque transmission section by inserting a hole enlarging mem- ber into said approximate hole shape portion and enlarging a distance between said contact portions, and a tensile preload is applied to said positive torque transmission section by elongating said positive torque transmission section by said compressive preload.

7. The power transmission according to claim 6, wherein a falling-off preventing member is provided for preventing falling-off of said hole enlarging member after torque interruption.

8. The power transmission according to claim 4, wherein
   a folded portion is formed on one of both divided parts in said negative torque transmission section formed as a divided structure, so as to be folded toward the other divided part,
   said folded portion is formed so that an interference is generated between an end part of said folded portion and an end part of said the other divided part when folded,
   a compressive preload is applied to said negative torque transmission section by making said interference vanish by folding of said folded portion and by bringing an end surface of said end part of said folded portion into surface contact with an end surface of said end part of said the other divided part, and
   a tensile preload is applied to said positive torque transmission section by elongating said positive torque transmission section by said compressive preload.

9. A power transmission in which a driven body and a drive body for driving said driven body are rotated in the same direction and are coupled through a coupling member, torque of said drive body is transmitted to said driven body, and transmission of torque from said drive body is interrupted when a drive load of said driven body exceeds a predetermined value, characterized in that said coupling member has, as separate sections in said coupling member, both of
   a positive torque transmission section for holding torque in a forward rotational direction and interrupting transmission of torque from said drive body by its own fracture when a drive load of said driven body exceeds said predetermined value, and
   a negative torque transmission section for holding torque in a reverse rotational direction, wherein
   said negative torque transmission section is disposed on each side of said positive torque transmission section,
   said positive torque transmission section is formed as a continuous structure,
   said negative torque transmission section is formed as a divided structure, and
   division portions of both negative torque transmission sections are disposed at positions shifted from each other in an extending direction of said positive torque transmission section.

\* \* \* \* \*